Patented Jan. 5, 1954

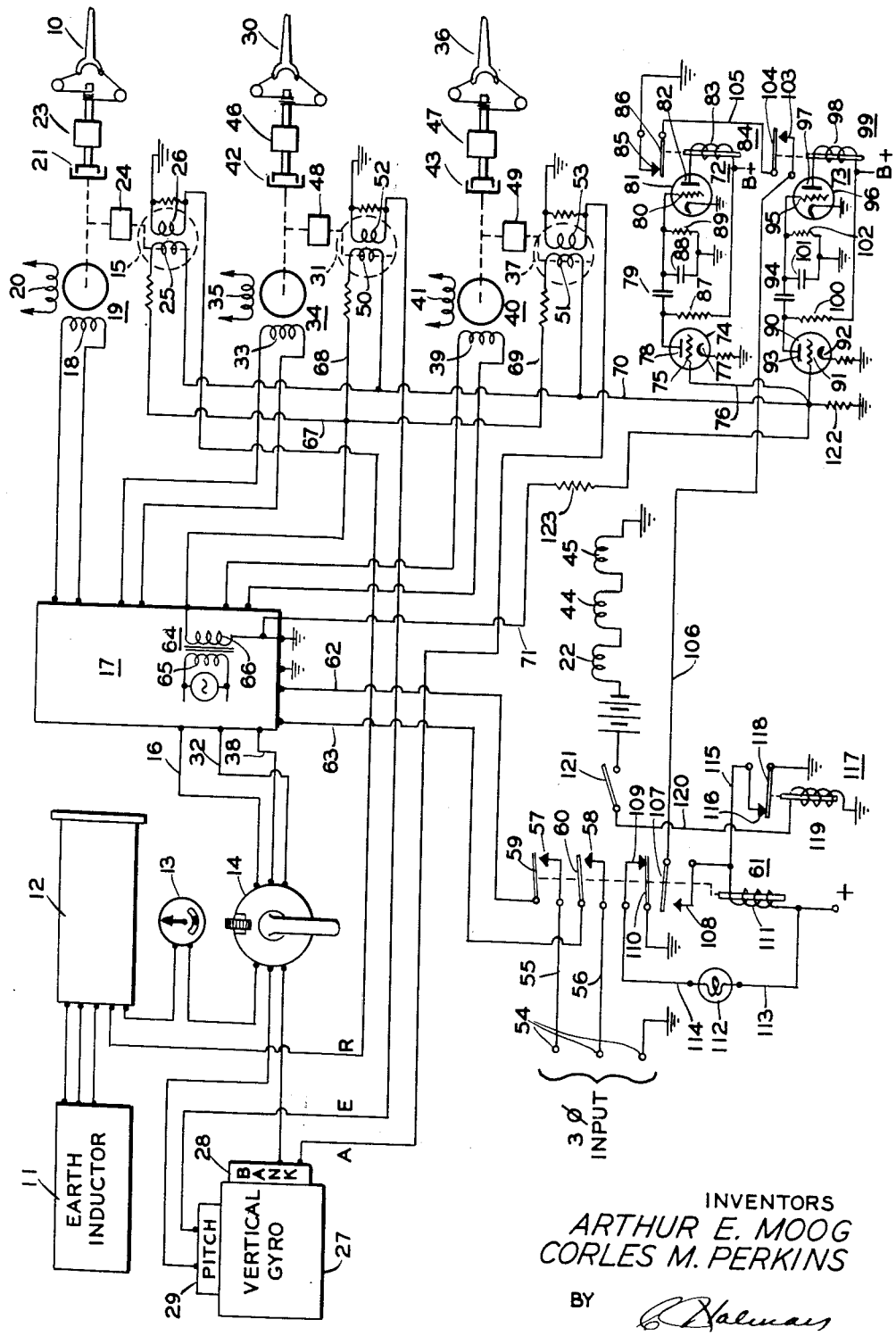

2,665,086

UNITED STATES PATENT OFFICE 2,665,086

AIRCRAFT CONTROL SYSTEM MONITOR

Arthur E. Moog, Caldwell, and Corles M. Perkins, Rutherford, N. J., assignors to Bendix Aviation Corporation, Teterboro, N. J., a corporation of Delaware Application November 3, 1949, Serial No. 125,284

17 Claims. (Cl. 244—77)

The present invention relates generally to safety or monitoring apparatus and more particularly to apparatus of this general character adapted for overcoming improper control of an aircraft by an automatic pilot system due to loss of follow-up in one or more of the control channels of the system.

Electric automatic pilot systems for aircraft currently in use generally comprise a three channel control arrangement, each channel, in turn, generally consisting of a displacement and trim signal generator for controlling a surface servomotor together with an eletcric follow-up signal generator for modifying the operation of the motor. It will be apparent that in any system as involved as an automatic pilot of the above character, failures are bound to occur notwithstanding the amount of care that has been exercised in the design and testing of the system. One source of such failure is the loss of follow-up for one or more of the servo motors. The follow-up exerts a damping action on the system; the loss of such damping causes undesirable oscillatory control of the craft about any one or more of the craft axes. Loss of follow-up can result from open leads, windings or brushes, or loss of excitation voltage to the follow-up signal generators, or excessive voltage, high or low, due to power supply surges, or excessive current flow due to shorts, etc.

The present invention contemplates the provision of novel safety or monitoring apparatus for an automatic steering system whereby in response to abnormal operation of follow-up the servomotors may be made automatically ineffective, either individually or in unison, on their related control surfaces.

An object of the present invention, therefore, is to provide novel safety apparatus for monitoring the operation of an aircraft automatic pilot.

Another object of the invention is to provide novel monitoring apparatus for an aircraft automatic pilot which in response to abnormal operation of follow-up will make the servomotor of the pilot automatically ineffective on its related control surface.

A further object is to provide in a positioning system utilizing a motor for operating a controlled member and a follow-up for modifying operation of the motor, novel apparatus responsive to abnormal operation of the follow-up for making the motor ineffective on the controlled member.

A still further object of the present invention is to provide a novel warning system for the human pilot of an aircraft incorporating an automatic steering system thereon to advise him that the follow-up channel of the system is operating improperly.

The above and other objects and advantages of the invention will appear more fully hereinafter from a consideration of the detailed description which follows when taken together with the accompanying drawing wherein one embodiment of the invention is illustrated. It is to be expressly understood, however, that the drawing is for the purpose of illustration and description only and is not designed as a definition of the limits of the invention.

The single figure of the drawing is a diagrammatic illustration of one embodiment of the novel safety apparatus of the present invention for monitoring the operation of an aircraft automatic pilot.

Referring now to the single figure of the drawing for a more detailed description of the novel safety apparatus of the present invention, the latter is shown as applied to a conventional all electric, three axes of control aircraft automatic pilot. As shown, such an automatic pilot generally comprises for the control of a rudder 10, a compass consisting of a stabilized earth inductor element 11 and a master direction indicator device 12 which receives and reproduces for control purposes the signals of element 11. In addition to the compass signal, rate of turn, course turn and follow-up signals are developed by a rate of turn device 13, a turn signal generator incorporated in a manual turn control unit 14 and an inductive follow-up device 15.

The various signal generators are series connected with each other and by way of a conductor 16 with the input of the rudder channel of an amplifier 17, the output of which is fed to the variable phase winding 18 of a two-phase induction motor 19 whose second phase winding 20 is connected with a suitable source of current. Motor 19 drivably connects through an electromagnetic clutch 21, having a control winding 22, and a gear reduction mechanism 23 with the rudder surface and through a gear reduction mechanism 24 with the wound rotor 25 of inductive follow-up device 15, whose stator winding 26 is fixed with respect to the craft.

For controlling the craft in bank and pitch a vertical gyro 27 is provided having bank and pitch take-offs 28 and 29. For control of aileron surface 30, bank, follow-up and bank trim signals are provided by bank take-off 28, inductive follow-up device 31 and a bank trim signal generator incorporated in turn control unit 14. The various signals of the bank channel are series connected with each other and by way of a conductor 32 with the input of the aileron channel of the amplifier, the output of which connects with the variable phase winding 33 of a two-phase induction motor 34, whose second phase winding 35 is connected with a suitable source of current.

For control of elevator surface 36, on the other hand, pitch, follow-up and pitch trim signals are provided by pitch take-off 29, inductive follow-up device 37 and a pitch trim signal generator incorporated in turn control unit 14. These signals, like those of the rudder and aileron channels, are series connected with each other and by way of a conductor 38 with the input of the elevator channel of the amplifier, the output of which connects with the variable phase winding 39 of a two-phase induction motor 40, whose second phase winding 41 is connected with a suitable source of current.

Motors 34 and 40 drivably connect through electromagnetic clutches 42 and 43, having control windings 44 and 45, respectively, and gear reduction mechanisms 46 and 47 with aileron and elevator surfaces 30 and 36 and through gear reduction mechanisms 48 and 49 with wound rotors 50 and 51 of inductive follow-up devices 31 and 37, whose stator windings 52 and 53 are fixed with respect to the craft.

The power supply for amplifier 17 is shown as a three phase source designated by numeral 54, one terminal of which is grounded and the other two terminals of which normally connect through conductors 55, 56, fixed contacts 57, 58, movable contacts 59, 60 of a relay 61 and conductors 62, 63 with the amplifier. On interruption of the power source, the various servomotors 19, 34 and 40 are made ineffective to the signals of their control channels so that in the absence of the source they will not operate to position the rudder, aileron and elevator surfaces.

The source of excitation voltage for the rotors 25, 50 and 51 of inductive devices 15, 31 and 37 is defined by a transformer 64 having a primary winding 65 and a secondary winding 66, the rotors being connected in parallel by way of leads 67, 68 and 69 with one end of the secondary and by way of leads 70 and 71 with the opposite and grounded end of the secondary winding.

Coming now to the novel safety apparatus of the present invention for monitoring the operation of the automatic pilot described, abnormal operation of any one or more of inductive follow-up devices 15, 31 and 37 will automatically disconnect power source 54 from amplifier 17 so that the servomotors will become ineffective to the signals in their respective amplifier channels whereby oscillatory control of the craft by the servos due to loss of the damping that had been afforded by the follow-up is prevented.

Abnormal operation of any one or more of the follow-up devices is detected by a low level alarm circuit 72 and a high level alarm circuit 73, both circuits being connected in leads 70 and 71. Low level circuit 72 comprises a vacuum tube 74 having a grid 75, which is connected by way of a lead 76 with the junction point of leads 70, 71, a cathode 77 and a plate 78 which connects through a condenser 79 with a grid 80 of a second tube 81 whose plate 82 connects with one end of a winding 83 of a relay 84, having a grounded fixed contact 85 and a movable contact 86, the opposite side of the relay winding connecting with a B+ supply, the latter also being connected with the plate 78 through a resistor 87. Included in the grid circuit of tube 81 are parallel connected condenser and resistor elements 88 and 89.

High level circuit 73, on the other hand, is generally similar to circuit 72, and includes a vacuum tube 90 having a grid 91, connected with the junction point of leads 70, 71, a cathode 92 and a plate 93. The latter plate connects through a condenser 94 with a grid 95 of a second tube 96 whose plate 97 connects with one end of a winding 98 of a relay 99, the opposite end of the relay winding connecting with plate 93 through a resistor 100. Included in the grid circuit of tube 96 are parallel connected condenser and resistor elements 101 and 102. Relay 99 includes a fixed contact 103 and a movable contact 104 which is connected by way of a lead 105 with movable contact 86 of relay 84.

Fixed contact 103 of relay 99 connects by way of a lead 106 with a movable contact 107 of relay 61, for a purpose to presently appear, the latter contact cooperating with a fixed contact 108 of relay 61. In addition to contacts 57, 59, contacts 58, 60 and contacts 107, 108, relay 61 also includes cooperating fixed and movable contacts 109 and 110, respectively.

Relay 61 includes a winding 111 which at one end is connected to a suitable direct current supply and to a terminal of a warning lamp 112 by way of a lead 113, the remaining terminal of the lamp connecting by way of a lead 114 with fixed contact 109, the cooperating movable contact 110 thereof being grounded as shown. The opposite end of winding 111 connects by way of a lead 115 with fixed contact 108 of relay 61 and also with a fixed contact 116 of a further relay 117, the latter having a grounded movable contact 118 and a winding 119. The latter winding is grounded at one end and at its opposite end connects by way of a lead 120 with a clutch switch 121 which, when closed, energizes clutch control windings 22, 44 and 45 to operate clutches 21, 42 and 43 to connect servomotors 19, 34 and 40 to their related rudder, aileron and elevator surfaces.

Inserted at the junction point of leads 70 and 71 is a grounded grid leak resistor 122 and also inserted in the excitation lead 71 of the inductive follow-up devices is a load resistor 123 whereby voltages are developed thereacross in accordance with the current flow to the inductive follow-up devices.

Coming now to the operation of the novel monitoring apparatus hereinabove described, it may be assumed that abnormal operation of one or more of the follow-ups has taken place so that effectively one or more of the servomotors is left without a follow-up. Such abnormal operation may arise from open circuit conditions caused by open leads, windings or brushes in the rotors of one or more of the follow-ups or it may arise due to loss of excitation voltage at secondary winding 66. As distinguished from loss of excitation voltage, abnormal operation may arise due to excessive current flow resulting from shorts in the rotor sides of the inductive follow-up devices or it may arise from excessive voltage due to power supply surges.

Whatever the cause for the abnormal operation of one or more of the inductive follow-up devices may be, it will resolve itself into current flow of a value other than a value having predetermined high and low operating limits.

The low and high level alarm circuits 72 and 73 are so designed that in response to current flow in the follow-up excitation circuit of a value between the two desired normal levels, there will be substantially no current flow at plate 82 of circuit 72 so that relay 84 will be maintained in a de-energized condition at which time its movable and fixed contacts 85, 86 will be in engagement. For the same current flow, circuit 73 is so designed that current will flow at plate 97 to normally maintain relay winding 98 energized so that fixed and movable contacts 103, 104 will be in engagement. In this manner, when relay 61 is energized, a ground connection is established for its winding 111 by way of fixed and movable contacts 107, 108 and lead 106.

An interlocking arrangement is provided for relay 61 in that once it has been de-energized, assuming elimination of the causes leading up to abnormal operation of the follow-ups causing the de-energization, clutch switch 121 must be opened to de-energize relay 117 whereby contacts 116, 118 are engaged to establish a ground connection for relay winding 111 and thereby energize relay 61. Opening of clutch switch 121 also results in disconnection of servomotors 19, 34 and 40 from their related surfaces. With normal current supply to the various rotors of the inductive follow-up devices, the pilot will close switch 121 to energize clutch control windings 22, 44 and 45 to drivably engage the servomotors with their related control surfaces. At the same time relay winding 119 is energized to cause disengagement between its fixed and movable contacts 116, 118 whereby the ground connection therethrough is removed from relay winding 111 but the latter relay remains energized because of its ground connection through fixed contact 85 of relay 84. It will be noted therefore that unless the causes providing abnormal operation of one or more follow-ups are removed closing of switch 121 will not permit operation of the servomotors because relay 61 will be without a ground connection.

Energization of relay 61 causes closing of its contacts 57, 59—58, 60—107, 108 and opening of its contacts 109, 110. Closure of contacts 57, 59 and 58, 60 establishes a connection between power supply source 54 and amplifier 17 while closure of contacts 107, 108 establishes a ground connection for relay 61 through fixed contact 85 of relay 84 so that should switch 121 be opened thereafter relay 61 will remain energized. Opening of contacts 109, 110 extinguishes lamp 112 indicating normal operation of the system, i. e., that each servomotor is provided with a proper follow-up.

Assuming now, the cause for abnormal operation of one or more of the follow-ups to be a drop in excitation current to a value below the predetermined low level operating value, the voltage drop across load resistor 123 will diminish and a decrease signal corresponding thereto will be communicated to both grids 75 and 91. The decreased signal on grid 75 will cause current flow at plate 82 to energize relay winding 83 whereupon movable contact 86 will disengage fixed contact 85 to effectively remove the ground connection for relay winding 111 to de-energize the latter. As a result source 54 is disconnected from amplifier 17 so that the servomotors become ineffective on their control surfaces and simultaneously lamp 112 is energized to visually warn the pilot of improper follow-up operation.

If, on the other hand, the cause for abnormal operation of one or more of the follow-ups is an increase in excitation current to a value in excess of the predetermined high level operating value, the voltage drop across load resistor 123 will increase and an increased signal corresponding thereto will be communicated to both grids 75 and 91. The increased signal on grid 91 will decrease current flow at plate 97 to de-energize relay winding 98 whereupon movable contact 104 will disengage fixed contact 103 to again effectively remove the ground connection for relay winding 111 to de-energize the latter. As a result source 54 will again be disconnected from amplifier 17 to make the servomotors ineffective on their related control surfaces and lamp 112 will become energized to indicate improper follow-up operation.

As indicated hereinabove, unless the source of trouble causing abnormal operation of the follow-ups is removed, servomotors 19, 34 and 40 cannot operate even though clutch switch 121 is closed to drivably engage the servos with their related surfaces. As soon, however, as the source of trouble is removed and the follow-ups are operating properly contacts 85, 86 of relay 84 and contacts 103, 104 of relay 99 will be closed to establish a ground connection for movable contact 107 of relay 61. When switch 121 is opened, a ground connection is established for relay 61 whereupon the latter becomes energized and remains so even though switch 121 is again closed to remove the ground connection through contacts 116, 118, the holding ground connection for relay 61 now being through contacts 107, 108.

While but one low level alarm circuit 72 and one high level alarm circuit 73 have been shown for all three of the inductive follow-up devices, it will be apparent that separate low and high level alarm circuits could be provided for each of the inductive follow-up devices.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

1. A positioning system having a motor for operating a controlled member, a signal source connected to the motor for the operation thereof, follow-up means connected to the motor for preventing oscillation of the system, said follow-up means being subject to abnormal operation during normal operation of the motor, and monitor means connected with the follow-up means and the signal source and responsive to abnormal operation of the follow-up means for making the signal source ineffective on the motor during abnormal operation of the follow-up means.

2. A positioning system having a motor for operating a controlled member, a signal source connected to the motor for the operation thereof, electrical damping means for modifying the operation of the motor, an excitation source for energizing the damping means, said excitation source being subject to abnormal operation, and monitor means responsive to abnormal energization of the damping means due to abnormal operation of the excitation source for making the signal source ineffective on the motor.

3. A positioning system having a motor for operating a controlled member, a signal source connected to the motor for the operation thereof, electrical follow-up means connected for operation by the motor to overcome oscillation of the system by modifying the operation of said motor, an excitation source connected for normally energizing the follow-up means, said excitation source being subject to abnormal operation, and means connected with the signal source and responsive to abnormal energization of the follow-up means due to abnormal operation of the excitation source for making the signal source ineffective on the motor.

4. A positioning system having a motor for operating a controlled member in response to a control signal, follow-up means connected to the motor for modifying the operation thereof for preventing oscillation of the system, said means comprising a two-part inductive device for developing a follow-up signal, a source of excitation current separate from said control signal for energizing one part of said device, said excitation source being subject to abnormal operation, and means connected with said device and responsive to excitation of said one part, due to abnormal operation of the excitation source, by a current having a value other than a value between predetermined maximum and minimum limits for making the motor ineffective.

5. An automatic pilot having a servomotor for operating a control surface of a mobile vehicle, follow-up means operable by said motor for preventing oscillation of the vehicle, the follow-up means being subject to both normal and abnormal operation during normal operation of the motor, and means connected with said motor and said follow-up means and responsive to abnormal operation of said follow-up means for making the motor ineffective for the operation of said control surface.

6. An automatic pilot having a servomotor for operating a craft surface, a signal source for actuating said motor, follow-up means operable by the operation of said motor for preventing oscillation of the craft, a source of excitation voltage other than said signal source for normally energizing said follow-up means, said excitation source being subject to abnormal operation, and means connected with said signal source and said follow-up means and responsive to abnormal energization of said follow-up means due to abnormal operation of the excitation source for rendering said signal source ineffective on said motor.

7. An automatic pilot having a servomotor for operating a craft surface, a signal source for actuating said motor, follow-up means operable by said motor for preventing oscillation of the craft, a source of excitation voltage for normally energizing said follow-up means, said excitation source being subject to abnormal operation, means connected to said follow-up means and operative in response to energization of the follow-up means, resulting from abnormal operation of the excitation source, by a current exceeding a predetermined maximum value, means connected to said follow-up means and operative in response to energization of the follow-up means, resulting from abnormal operation of the excitation source, by a current having a value less than a predetermined minimum value, and means connected with both of said last-named means and responsive to the operation thereof for making the signal source ineffective on said motor whereby said motor is prevented from operating during abnormal energization of the follow-up means.

8. An automatic pilot having a servomotor for operating a craft surface, a signal source for actuating said motor, follow-up means operable by said motor for preventing oscillation of the craft, a source of excitation voltage for normally energizing said follow-up means, said excitation source being subject to abnormal operation, a high limit circuit connected to said follow-up means and operative in response to energization of the follow-up means, resulting from abnormal operation of the excitation source, by a current exceeding a predetermined maximum value, a low limit circuit connected to said follow-up means and operative in response to energization of the follow-up means, resulting from abnormal operation of the excitation source, by a current having a value less than a predetermined minimum value, and means connected with said circuits and responsive to the operation thereof for making the signal source ineffective on said motor during abnormal energization of the follow-up means.

9. An automatic pilot having a servomotor for operating a craft surface, a signal source for actuating said motor, follow-up means operable by said motor for preventing oscillation of the craft by modifying the operation of said motor, said follow-up means being subject to both normal and abnormal operation during normal operation of said motor, and safety means for monitoring the operation of said follow-up means whereby in response to abnormal operation of said follow-up means said signal source is made ineffective on said motor.

10. An aircraft automatic pilot having a servomotor for operating a craft surface, follow-up means operable by said motor for preventing oscillation of the aircraft, said follow-up means being subject to both normal and abnormal operation during normal operation of the servomotor, monitoring means connected with said motor and said follow-up means and operative in response to abnormal follow-up operation for making the motor ineffective, and warning means energized by operation of said monitoring means.

11. An aircraft automatic pilot having servomotors for operating craft rudder, aileron and elevator surfaces, individual follow-up means operable by each of said motors for preventing oscillation of the aircraft, each follow-up means being subject to both normal and abnormal operation during normal operation of its related servomotor, and monitoring means connected with each of said follow-up means and operative in response to abnormal operation of at least one of said follow-up means for making at least one of said motors ineffective.

12. An aircraft automatic pilot having servomotors for operating craft rudder, aileron and elevator surfaces, a follow-up device for each of said motors for preventing oscillation of the aircraft, each follow-up device being subject to both normal and abnormal operation during normal operation of its related servomotor, and monitoring means connected with said follow-up devices and operative in response to abnormal operation of one or more of said follow-up devices for making all of said motors ineffective on their related control surfaces.

13. A positioning system having a motor for operating a controlled member, actuating means for operating the motor, damping means for modifying the operation of said motor, said damping means being subject to both normal and abnormal operating conditions during operation of said motor by said actuating means, and means connected with the damping means for making the actuating means effective on the motor during normal operation of the damping means and for making the actuating means ineffective on the motor during abnormal operation of the damping means.

14. In an automatic pilot, a servomotor having an input for receiving signals to command servomotor operation and an output for operating a control surface, signal means for sending a command signal to said input, a damping means associated with said output for modifying servomotor operation, and a monitor means associated with said input and output for rendering the command signals ineffective upon said input when the damping means fails to operate.

15. An automatic pilot having a servomotor for operating the control surface of a mobile vehicle, a command source for actuating said servomotor, a damping means operable by said servomotor for preventing oscillation of said vehicle, a source of energy for said damping means, and a means associated with said command source and said energy source for rendering the command source ineffective for actuating said servomotor when said energy source is not within predetermined energy levels.

16. An automatic pilot system having a servomotor for operating a vehicle surface and a damping means for preventing oscillation of the vehicle, a signal voltage source for actuating said servomotor, an excitation voltage source for energizing said damping means, and a means associated with said signal and excitation sources for monitoring the excitation voltage whereby in response to voltages not within predetermined levels said signal source is made ineffective on said servomotor.

17. An automatic pilot system having a servomotor for operating a vehicle surface and a damping means for preventing oscillation of the vehicle, a signal voltage source for actuating said servo motor, an excitation voltage source for energizing said damping means, and a safety means associated with said signal and excitation sources for monitoring at least one of said voltages whereby when the monitored voltage is not within predetermined levels said signal source is made ineffective on said servomotor.

ARTHUR E. MOOG.
CORLES M. PERKINS.

References Cited in the file of this patent

UNITED STATES PATENTS

| Number | Name | Date |
| --- | --- | --- |
| 1,436,280 | Minorsky | Nov. 21, 1922 |
| 2,415,430 | Frische et al. | Feb. 11, 1947 |
| 2,480,574 | Hanna et al. | Aug. 30, 1949 |
| 2,487,793 | Esval et al. | Nov. 15, 1949 |